United States Patent [19]

Coddington

[11] 4,175,524
[45] Nov. 27, 1979

[54] INLET AIR TEMPERATURE CONTROL FOR AUTOMOBILE ENGINE

[75] Inventor: Thomas T. Coddington, Troy, Mich.

[73] Assignee: Chrysler Corporation, Highland Park, Mich.

[21] Appl. No.: 852,424

[22] Filed: Nov. 17, 1977

[51] Int. Cl.² ............................................. F02M 31/00
[52] U.S. Cl. .............................. 123/122 D; 123/122 H
[58] Field of Search ....................... 123/122 D, 122 H; 236/101 D, 101 A, 101 C

[56] References Cited

U.S. PATENT DOCUMENTS

| 3,913,544 | 10/1975 | Fyie | 123/122 D |
| 3,918,421 | 11/1975 | Berry et al. | 123/122 D |

Primary Examiner—Ronald H. Lazarus
Attorney, Agent, or Firm—Baldwin & Newtson

[57] ABSTRACT

Ambient inlet air and preheated inlet air are supplied to an internal combustion engine in proportions controlled by a proportioning valve to determine the temperature of the resultant inlet air mixture. Means responsive to the inlet air temperature downstream of the proportioning valve cooperate with an engine vacuum source to apply a temperature modulated motor actuating pressure to a vacuum motor, which in turn operates the proportioning valve to increase the proportion of ambient air as the inlet air mixture approaches a predetermined engine operating temperature. A restricted temperature responsive one-way check valve means retards the rate of flow of motor actuating pressure to the motor when the inlet air temperature downstream of the proportioning valve is above a predetermined minimum, prevents said flow entirely when the inlet air temperature is below said predetermined minimum, and enables the reverse flow of pressure freely from the motor regardless of temperature.

12 Claims, 5 Drawing Figures

INLET AIR TEMPERATURE CONTROL FOR AUTOMOBILE ENGINE

BACKGROUND AND OBJECTS OF THE INVENTION

It is desirable in the operation of an automobile engine to supply combustion supporting air at approximately a predetermined operating temperature, for example at 70° F., during cruise or light acceleration. At ambient temperatures below the desired operating temperature, preheated inlet air and cooler ambient air are supplied to the customary inlet air cleaner in variable proportions via separate ports to obtain the desired operating temperature for the inlet air mixture. The openings for the separate ports for the preheated and ambient air are controlled by a flow control gate operated by a vacuum motor responsive to the temperature modulated pressure of a vacuum source. The U.S. Pat. No. 3,444,847 to King illustrates a conventional inlet air temperature system wherein the vacuum source comprises the inlet manifold pressure modulated by a temperature controlled variable air bleed to the atmosphere. The air bleed is varied in response to the temperature of the inlet air mixture downstream of the flow control gate.

During cruise or steady state operation of the automobile, the temperature modulated vacuum source maintains the vacuum motor and flow control gate at positions required for proper inlet air temperature. Upon rapid acceleration from the cruise condition, the intake manifold vacuum becomes insufficient to hold the vacuum motor and flow control gate at the cruise condition, whereupon the flow control gate opens wide to the ambient inlet air and closes to the pre-heated inlet air. The resulting sudden drop in inlet air temperature often adversely affects engine driveability. When the inlet air mixture is below a predetermined temperature, say about 50° F., the engine is usually operating below its optimum operating temperature. It is then preferable to maintain the flow control gate open to the pre-heated inlet air even during acceleration. Above approximately 50° F., the colder ambient air is desired for improved acceleration, but preferably should be added gradually during the initial acceleration to achieve optimum driveability, particularly with automobile engines operating with lean fuel-air mixtures.

An important object of the present invention is to provide improved means including a temperature controlled check valve between the customary temperature modulated vacuum source and the vacuum motor, such that the vacuum motor is freely connected with the modulated vacuum source at all ambient temperatures when the pressure at the source is less than the pressure at the motor. As the pressure at the modulated vacuum source increases during rapid acceleration when the inlet air mixture downstream of the flow control gate is colder than a predetermined temperature, say 50° F., fluid flow to the motor is positively blocked. Thus, the movement of the vacuum motor and of the flow control gate to increase the proportion of colder inlet air is also blocked. However, the check valve permits such movement at a retarded rate with respect to the change in the modulated vacuum pressure during acceleration when the above defined inlet air mixture is warmer than the predetermined temperature.

In accordance with the foregoing, when the temperature of the inlet air mixture is below 50° F. during cruising conditions, the pressure of the modulated vacuum source operates the vacuum motor to move the flow control gate to a position for supplying pre-heated inlet air tending to raise the temperature of the inlet air mixture to the desired 70° F. operating temperature. During rapid acceleration, the vacuum motor will not respond to a change in the pressure at the vacuum source and the flow control gate will remain open go the pre-heated inlet air.

When the temperature of the inlet air mixture rises above 50° F., the vacuum motor will operate to move the flow control gate gradually to increase the proportion of cooler ambient air in the inlet air mixture during rapid acceleration. Thus, the engine will receive a cooler inlet air mixture as desired for optimum acceleration, but will not stumble momentarily as a result of a sudden drop in inlet air temperature during the initial stage of the acceleration.

Other objects of this invention will appear in the following description and appended claims, reference being had to the accompanying drawings forming a part of this specification wherein like reference characters designate corresponding parts in the several views.

Figure 1:
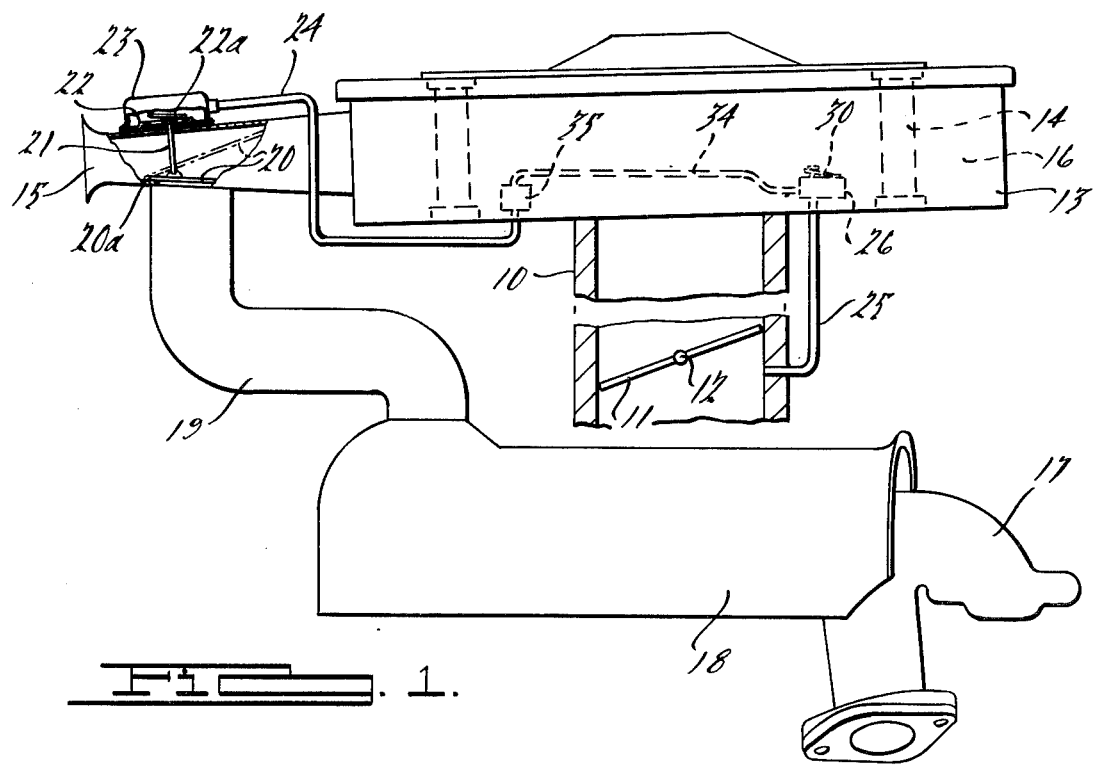
FIG. 1 is a fragmentary elevational view with portions broken away showing an inlet air temperature control system embodying the present invention.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, portions of a conventional automobile engine are illustrated comprising a carburetor 10 having a butterfly type throttle 11 pivotal at 12 within the carburetor induction conduit. Combustion supporting inlet air for the engine is supplied to induction conduit through an air cleaner assembly comprising a housing 13 containing an annular filter element 14 and opening to the atmosphere to receive ambient inlet air through a snorkel 15. Snorkel 15 communicates with an annular space 16 within the housing 13 and around the annular filter element 13. The inlet air is filtered as it passes radially inwardly through the filter element 14 and is then directed downwardly through the carburetor induction conduit according to the opening of throttle 11.

Hot exhaust gases from the engine are discharged conventionally through an exhaust manifold 17 which in the present instance is partially enclosed by a stove 18 for pre-heating inlet air. A conduit 19 conducts preheated inlet air from the stove 18 to the snorkel 15. A swinging flow control gate 20 pivotally mounted in the snorkel 15 at 20a controls the opening of the duct 19 into the snorkel 15 and also controls the opening of the latter to ambient air. The gate 20 is suitably connected by means of a plunger 21 with a diaphragm 22 of a vacuum motor 23, which is connected by duct 24 with a vacuum source as described below. A spring 22a normally urges the diaphragm 22 and plunger 21 downwardly to hold the gate 21 at the position illustrated in solid lines, thereby to close the opening of the conduit 19 into the snorkel 15 and to open the latter completely to ambient air.

The undersurface of diaphragm 22 is exposed to atmospheric pressure. Thus upon the application of vacuum to the motor 23 via a conduit 24, i.e. the application of a reduced pressure against the upper surface of the diaphragm 22, the latter will move upwardly against the force of spring 22a and swing gate 20 counterclockwise. By controlling the vacuum force supplied via conduit 24, predetermined proportions of pre-heated inlet air via duct 19 and cooler ambient air via 15 are obtained to approximate a predetermined temperature, say 70° F., for the resulting inlet air mixture.

The primary vacuum source is provided via duct 25 having one end in communication with the carburetor induction conduit or intake manifold downstream of the throttle 11 and having an opposite restricted end 25e in communication with the interior of a temperature responsive air bleed device 26. The latter interior communicates with the atmosphere via a bleed port 27 controlled by a ball type valve 28. A plunger 29 connects the valve 28 with one end of a temperature responsive bimetal arm 30 having its other end secured at 31 to an adjustment arm 32 integral with the device 26. An adjusting screw 33 within the device 26 projects against the arm 32 to adjust its angular position and thereby to adjust the position of the valve 28 with respect to the bleed port 27.

The operation of the device 26 may be conventional. It is apparent that manifold vacuum supplied to the interior of device 26 via restricted duct 25 will be modulated in accordance with the position of the valve 28, which in turn is determined by the position of the temperature responsive bimetal 30. The latter is located within the inlet air flow downstream of the gate 20 and preferably within the confines of the annular filter element 14 so as to be responsive to the temperature of the inlet air mixture supplied to the engine. When the temperature of the inlet air mixture is below a predetermined operating temperature, the valve 28 will be at its closed position shown and the maximum vacuum supplied via duct 25 will be applied to the interior of the device 26. As the inlet air temperature approaches the desired operating temperature, the bimetal 30 will move plunger 29 and valve 28 downwardly to permit a metered bleed of atmospheric air through port 27 into the interior of the device 26, thereby to reduce the vacuum therein, i.e. to increase the pressure.

The pressure within the interior of 26 is transmitted via duct 34 to an upper chamber 36 within a cylindrical check valve device 35 comprising a pair of interfitting cup shape members 35a and 35b located in the inlet air flow within the filter housing 13. Below the chamber 36, the cylindrical sidewall of the member 35a enlarges radially to provide an annular recess for an O-ring seal 37. The lower end of the member 35a comprises an annular footing that seats on an underlying annular flange 38 of a cup-shaped valve support 39. The latter comprises a cylindrical portion that extends upwardly from the flange 38 adjacent the interior of the member 35a and is offset inwardly at 40 in annular sealing engagement with the O-ring 37. The valve support 39 extends transversely across the interior of the member 35a to comprise a lower wall for the chamber 36 and is provided with a central opening 41 confining a thickened body portion of an umbrella seal 42. The latter has a central axially extending unrestricted passage 43 therethrough and a highly flexible annular sealing portion or crown 44 that overlies a plurality of unrestricted ports 45 through the support 39. The flexible crown 44 operates to flatten against the upper portion of the support 39 and close the ports 45 when subject to pressure from above.

Underlying and spaced from the support 39 to provide a cylindrical chamber 48 is a temperature responsive bimetallic disc 46 having a plurality of unrestricted ports 47 extending therethrough. Underlying and spaced from the disc 46 to provide a cylindrical chamber 50 is a second cup shaped valve support 49 having peripheral cylindrical walls terminating upwardly in an out-turned annular flange 51 pressed firmly into position against the adjacent cylindrical sidewall of the support 39 and peripheral portions of the disc 46 to clamp the latter against the upper flange 40. Preferably the flange 51 is secured to the adjacent wall of the support 39, as for example, by welding. Similarly to the support 39, the support 49 has a central aperture 52 confining the body of a flexible umbrella valve 53 therein. The latter is provided with a thin flexible sealing crown 54 that overlies a plurality of unrestricted passages 55 through the support 49. Located radially beyond the periphery of the flexible crown 54 is a restricted port 56 through the support 49.

The base of the cup-shaped member 35b underlies and is spaced from the base of the support 49 to provide chamber 57. The upper peripheral edge 58 of the member 35b contains an annular recess for an O-ring seal 59 in sealing engagement with the underside of the flange 38.

The dimensions and operating parameters of the parts described are selected so that during normal cruise conditions with the engine warm and ambient temperature in the neighborhood of 50°-60° F., the bimetal 30 and valve 28 will be at intermediate positions to hold the bleed port 27 partially open. Thus the intake manifold vacuum transmitted by the restricted duct 25 to the interior of the temperature responsive bleed device 26 will be modulated by the partially open bleed port 27, such that the modulated vacuum applied via port 24 to the upper vacuum side of diaphragm 22 will move gate 20 to an intermediate position for admitting ambient and preheated air to the air cleaner 13 in the proportions required to obtain the desired operating temperature of approximately 70° F. for the resulting inlet air mixture.

Should the temperature of either the ambient or stove air change, the thermostatic bimetal 30 will establish a slightly different equilibrium position and the resulting temperature of the inlet air mixture will change accordingly, but the temperature change will be nominal and will not adversely affect driveability. In fact, even with ambient temperatures as low as −20° F. when the bimetal 30 completely closes port 27, the resulting equilibrium temperature of the inlet air supplied via duct 19 will only drop a few degrees, usually less than 5° F., from the desired inlet air temperature.

In the operation of a specific automobile by way of example, the gate 20 will be at the FIG. 1 solid line position for admitting only ambient air when a vacuum of 5½ inches of mercury is applied to the motor 23 (i.e., 5½ inches mercury below atmospheric pressure corresponding to an intake manifold pressure during rapid acceleration approximating wide open throttle operation) and will be at its limit of counterclockwise movement for admitting only stove air via 19 when a vacuum of 8½ inches of mercury is applied to motor 23. The latter pressure corresponds to intake manifold pressure during rapid cruise and light load operation. In the above example, the temperature of the inlet air mixture is usually about 70° F. at an intake manifold pressure of 7 inches mercury and may fall as low as 65° F. at an intake manifold pressure of 8 inches mercury. At ambient temperatures above a predetermined limiting value, say 75° F., the gate 20 will be at the limit of its clockwise movement to completely shut off the preheated stove air from duct 19.

In the event of rapid acceleration from the aforesaid warm cruise condition, the intake manifold pressure transmitted through restricted duct 25 will increase and be transmitted freely through duct 34 and preferably through a filter 60 into chamber 36, passage 43, and ports 47, but will cause check valve 53 to close passages 55. In consequence the increased manifold pressure will be transmitted through restriction 56 and duct 24 at a retarded rate to the upper of low pressure side of the diaphragm 22 and in cooperation with spring 22a will gradually move plunger 21 downward and gate 20 clockwise toward the solid line position illustrated in FIG. 1. The time required to move the gate 20 to the FIG. 1 position for shutting off the preheated stove air and for opening snorkel 15 fully to the ambient air will depend upon the characteristics of the specific engine and the initial position of the gate 20 prior to the acceleration. The maximum time will be but a few seconds at most and usually less than one second. Accordingly, a sudden inflow of cold ambient air more rapidly than the engine can handle during the initial stage of the acceleration is avoided.

At inlet air temperatures within filter 13 below approximately 50° F., the bimetal 46 moves to the FIG. 4 position to close passage 43. In that position, low intake manifold pressure or vacuum may be transmitted freely to the motor 23 to move diaphragm 22 upwardly against the tension of spring 22a and thus swing gate 20 counterclockwise to completely shut off ambient air via snorkel 15 and to completely open the communication between the preheated stove air from conduit 19 and the air cleaner 13. During such low temperatures the bimetal 30 will be at the limit of its upward movement, completely closing bleed port 27 by means of valve 28. The maximum manifold vacuum is then effective for operating the motor 23. During the cold operating condition, there will be no delay in moving the gate 20 to the position for supplying hot stove air to the air cleaner 13 because any gas pressure in the motor 23 above diaphragm 22 will be conducted via duct 24 into chamber 57 of the device 35 and thence substantially without restriction through the ports 55, 47 and 45 into chamber 36, via ducts 34 and 25 to the intake manifold. A nominal delay will be affected by the restriction 25a, but the rate of gas flow through the latter is comparatively large with respect to the rate through restriction 56.

Figure 4:
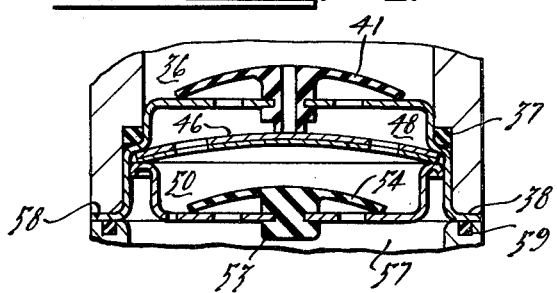

During acceleration when the thermostat 46 is at the position of FIG. 4 and the bleed port 27 is closed by operation of the valve 28 and thermostat 30 in the cooler inlet air, the increase in intake manifold pressure resulting from the acceleration is transmitted through the restricted duct 25 to duct 34 and thence to the upper chamber 36 of the device 35. The higher pressure in chamber 36 with respect to the lower pressure in chamber 48 causes the flexible umbrella valve 42 to close passage 45 and prevent the increased manifold pressure from actuating motor 23. In consequence the gate 20 will remain in the position for admitting hot stove air to the cleaner 16 and for preventing the inflow of cold ambient air. This situation will prevail until the bimetal 46 is warmed by the surrounding inlet air within air cleaner 16 and moves to open passage 43.

Figure 3:
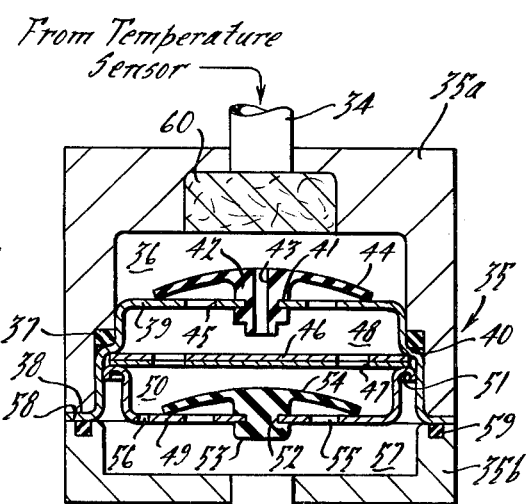
FIGS. 3 and 4 are enlarged sectional views showing the temperature responsive check valve for controlling the vacuum motor during warm and cold inlet air conditions respectively.
Figure 5:
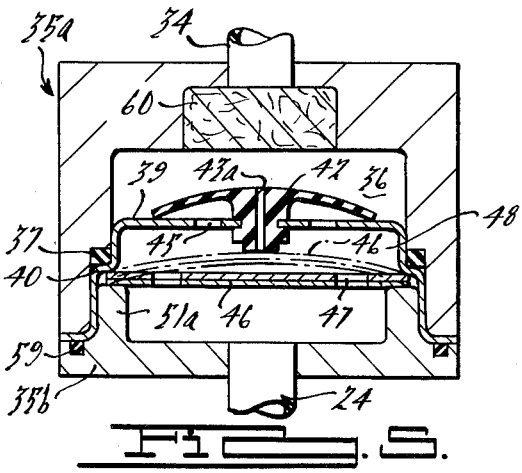
FIG. 5 is a view similar to FIG. 3, showing a modification.

The structure illustrated in FIGS. 3 and 4 accommodate situations where it is not feasible to provide a tiny bleed passage through the body of the material of the umbrella valve 42. Where it is feasible to provide such a restricted passage, a simplified and preferred construction for the device 35 is illustrated in FIG. 5 wherein corresponding parts are numbered and function the same as described above. The primary distinction of the check valve illustrated in FIG. 5 is that the umbrella valve 53 and its support 49 are eliminated and the unrestricted passage 43 of FIG. 3 is replaced by a restricted passage 43a. The base of the member 35b is provided with an annular upstanding wall portion 51a that underlies and clamps the peripheral portions of the bimetal disc 46 against the flange 40.

Figure 2:
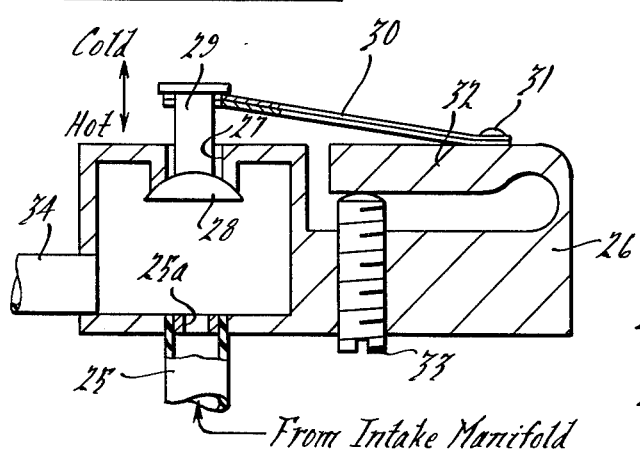
FIG. 2 is an enlarged sectional view through the temperature responsive atmosphere air bleed for modulating the operating pressure for the vacuum motor.

In accordance with the structure of FIG. 5, during warm operating conditions when the thermostat 46 is at the open position illustrated in solid lines, FIG. 5, a sudden increase in the modulated manifold pressure resulting from rapid acceleration is transmitted via 25 and 34 to the upper chamber 36 and thence via restriction 43a, which replaces the above described restriction 56, to chamber 48 and thence without restriction through passages 47 and conduit 24 to motor 23 for actuating the latter as described above. The restriction 43a serves the same purpose as the restriction 56 above described. During cold operating condition, the thermostat 46 moves upwardly to the dotted position illustrated in FIG. 5 and closes passage 43a. In consequence an increase in intake manifold pressure resulting from rapid acceleration cannot be transmitted from chamber 36 to chamber 48 and is thus not available to affect the operation of the motor 23 as described above in regard to FIGS. 2 and 3.

Having thus described my invention I claim:

1. In an internal combustion engine having an inlet air passage, first and second air inlet means for supplying ambient air and preheated air respectively to said passage, means for controlling the ratio of the ambient air to the preheated air supplied to said passage from said first and second inlet means to control the temperature of the air flow in said passage comprising proportioning valve means for controlling the communication between said passage and said air inlet means, a pressure actuated motor responsive to sub-ambient pressures for urging said proportioning valve means to decrease said ratio, temperature actuated means responsive to temperatures related to engine operation for modulating a pressure related to engine operation to effect a modulated motor actuating pressure comprising a function of the last named temperatures, and conduit means for applying the modulated pressure to said motor, the combination of check valve means for restricting the rate of fluid flow in said conduit means in one direction to said motor and for enabling fluid flow in said conduit means freely in the reverse direction from said motor, and second temperature actuated means responsive to temperatures related to engine operation and below a predetermined value for blocking said restricted fluid flow in said conduit means in said one direction to said motor.

2. In the combination according to claim 1, said pressure related to engine operation comprising the pressure in said passage downstream of a throttle for controlling fluid flow in said passage, said temperature actuated means comprising means responsive to the temperature of the fluid flow in said passage downstream of said proportioning valve.

3. In the combination according to claim 2, said second temperature actuated means comprising means responsive to temperature below a desired operating range for said engine for blocking said restricted fluid flow in said one direction to said motor.

4. In the combination according to claim 2, said motor comprising means for urging said proportioning valve means to increase said ratio progressively upon the application of progressively increasing motor actuating pressure to said motor.

5. In the combination according to claim 4, said second temperature actuated means comprising means responsive to temperature below a desired operating range for said engine for blocking said restricted fluid flow in said one direction to said motor.

6. In a combination responsive to temperature for controlling the application of pressure from two separate pressure sources to a pressure actuated motor, a housing having a hollow interior and two restricted ports communicating with said interior for connecting the latter with said separate pressure sources respectively and having a third port communicating with said interior for connecting the latter with said motor, means for varying the restriction of one of the first named two ports comprising first temperature actuated valve means responsive to temperatures below a first predetermined value for normally closing said one port to said interior and responsive to progressively increasing temperatures within a predetermined range above said value for progressively opening said one port to said interior, check valve means including a free flowing opening means in one flow direction and a relatively restricted flow opening means to provide a two way slow flow rate communication in parallel with the free flowing control for restricting the rate of fluid flow in one direction through said third port from said interior and for enabling fluid flow comparatively freely in the reverse direction through said third port into said interior, and second temperature actuated valve means responsive to temperatures below a second predetermined value for blocking the restricted rate of fluid flow in said one direction.

7. In the combination according to claim 6, said one port and first temperature actuated valve means comprising means responsive to progressively increasing temperatures above said first predetermined value for progressively increasing communication between said interior and substantially atmospheric pressure, the other of said first named two ports comprising means for connecting said interior to sub-atmospheric pressure, said second temperature actuated valve means comprising means responsive to temperatures somewhat below the first predetermined value for blocking said restricted rate of fluid flow in said one direction.

8. In the combination according to claim 7, a pressure actuated motor, and means connecting said motor through said one-way check valve means and third port to said interior for restricting said rate of fluid flow in said one direction from said interior to said motor and for enabling said fluid flow comparatively freely in said reverse direction from said motor into said interior.

9. In the combination according to claim 6, an air induction passage for an internal combustion engine, a throttle in said passage for controlling air flow therethrough, first and second air inlet means for said induction passage upstream of said throttle for receiving ambient inlet air and preheated inlet air respectively, means for controlling the temperature of the inlet air flow through said passage comprising proportioning valve means for controlling the ratio of ambient inlet air flow through said first air inlet means into said passage with respect to preheated inlet air flow through said second air inlet means into said passage, a pressure actuated motor responsive to sub-atmospheric pressure for urging said proportioning valve means to decrease said ratio, means for connecting said motor through said third port with said interior, biasing means for yieldingly urging said proportioning valve means to increase said ratio, means for connecting said substantially atmospheric pressure to said interior through said one port, and means for connecting the pressure of said induction passage at a location downstream of said throttle to said interior through the other of the first named two ports.

10. In the combination according to claim 9, said second temperature actuated valve means comprising means responsive to temperatures below a second predetermined value lower than the first predetermined value for blocking said restricted rate of fluid flow in said one direction.

11. In the combination according to claim 9, means for effecting heat exchange relationship between said first and second temperature actuated valve means and said inlet air flow downstream of said proportioning valve means for actuating said temperature responsive valve means in response to the temperature of the last named air flow.

12. In the combination according to claim 6, said second predetermined value corresponding to a temperature lower than the temperature corresponding to said first predetermined value.

* * * * *